(12) United States Patent
Magari et al.

(10) Patent No.: US 6,924,062 B2
(45) Date of Patent: Aug. 2, 2005

(54) NICKEL-METAL HYDRIDE STORAGE BATTERY

(75) Inventors: Yoshifumi Magari, Kobe (JP); Tadayoshi Tanaka, Takatuki (JP); Hiroyuki Akita, Kobe (JP); Katsuhiko Shinyama, Kobe (JP); Atsuhiro Funahashi, Suita (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 257 days.

(21) Appl. No.: 10/321,397

(22) Filed: Dec. 18, 2002

(65) Prior Publication Data

US 2003/0129491 A1 Jul. 10, 2003

(30) Foreign Application Priority Data

Dec. 21, 2001 (JP) ........................................ 2001-389943

(51) Int. Cl.$^7$ ............................................... H01M 4/62
(52) U.S. Cl. .................... 429/218.2; 429/223; 429/232; 429/235; 429/126
(58) Field of Search ............................. 429/218.2, 223, 429/232, 235

(56) References Cited

U.S. PATENT DOCUMENTS

| 5,547,784 A | 8/1996 | Okawa et al. ........... 429/218.1 |
| 6,027,834 A | 2/2000 | Hayashi et al. ............. 429/223 |

FOREIGN PATENT DOCUMENTS

| CN | 1179631 A | 4/1998 |
| EP | 1 006 598 A2 | 6/2000 |
| EP | 1 075 031 A1 | 2/2001 |
| JP | 06-215765 A | 8/1994 |
| JP | 2001-76730 | * 3/2001 |

* cited by examiner

Primary Examiner—Laura Weiner
(74) Attorney, Agent, or Firm—Kobovcik & Kubovcik

(57) ABSTRACT

A nickel-metal hydride storage battery which includes a positive electrode containing nickel hydroxide, a negative electrode containing a hydrogen absorbing alloy and an alkaline electrolyte, wherein the positive electrode contains a hydroxide and/or an oxide of an element selected from the group consisting of calcium, strontium, scandium, yttrium, lanthanoid and bismuth, and the negative electrode contains a hydroxide and/or an oxide of at least one element selected from the group consisting of scandium, yttrium and lanthanoid.

11 Claims, 1 Drawing Sheet

US 6,924,062 B2

NICKEL-METAL HYDRIDE STORAGE BATTERY

FIELD OF THE INVENTION

The present invention relates to a nickel-metal hydride storage battery that includes a positive electrode containing nickel hydroxide, a negative electrode containing a hydrogen absorbing alloy and an alkaline electrolyte. Specifically, a nickel-metal hydride storage battery of the present invention is characterized by improvements in charge-discharge cycle characteristics and discharge characteristics at a low temperature.

BACKGROUND OF THE INVENTION

A nickel-metal hydride storage battery, nickel-cadmium storage battery, nickel-zinc storage battery, and the like, have been used as alkaline storage batteries. The nickel-metal hydride storage battery that has a high output and is environmentally safe is especially widely used as an electric source for electric vehicles, hybrid electric vehicles, electric bicycles, power tools, and the like.

A nickel-metal hydride storage battery uses nickel hydroxide for a positive electrode and a hydrogen absorbing alloy for a negative electrode.

There is a problem in a nickel-metal hydride storage battery that when the battery is repeatedly charged and discharged, the hydrogen absorbing alloy used for the negative electrode is deteriorated by oxidation, which is caused by oxygen generated at the positive electrode during overcharge, and gradually the discharge capacity of the battery is reduced and charge-discharge characteristics are deteriorated. There is also a problem that the release of hydrogen from the hydrogen absorbing alloy in which hydrogen is absorbed becomes slow when the nickel-metal hydride storage battery is used at a low temperature and deteriorates discharge characteristics at the low temperature.

An alkaline storage battery with improved charge-discharge cycle characteristics has been proposed that is provided by the addition of yttrium or a yttrium compound to a negative electrode containing a hydrogen absorbing alloy (as disclosed in Japanese patent Laid-open publication (Tokkai) No. Hei 6-215765) to prevent oxidation of the hydrogen absorbing alloy used for the negative electrode that is caused by oxygen generated from the positive electrode during overcharge.

However, even such an improved alkaline storage battery in which yttrium or a yttrium compound is added to the hydrogen absorbing alloy used for the negative electrode cannot exhibit sufficiently improved charge-discharge cycle characteristics. Discharge characteristics at a low temperature are also not sufficiently improved.

OBJECTS OF THE INVENTION

Objects of the present invention are to solve the above-described problems in a nickel-metal hydride storage battery comprising a positive electrode containing nickel hydroxide, a negative electrode containing a hydrogen absorbing alloy and an alkaline electrolyte, to prevent deterioration of the hydrogen absorbing alloy used for the negative electrode by oxidation which is caused by oxygen generated from the positive electrode when the battery is overcharged, and to sufficiently improve charge-discharge cycle characteristics of the battery. Obtaining a sufficient discharge capacity when the battery is discharged under a low temperature is also an object of the present invention.

SUMMARY OF THE INVENTION

In the present invention, in order to solve the above-described problems, the positive electrode contains a hydroxide and/or an oxide of at least one element selected from the group consisting of calcium, strontium, scandium, yttrium, lanthanoid and bismuth, and the negative electrode contains a hydroxide and/or an oxide of at least one element selected from the group consisting of scandium, yttrium and lanthanoid.

Figure 1:
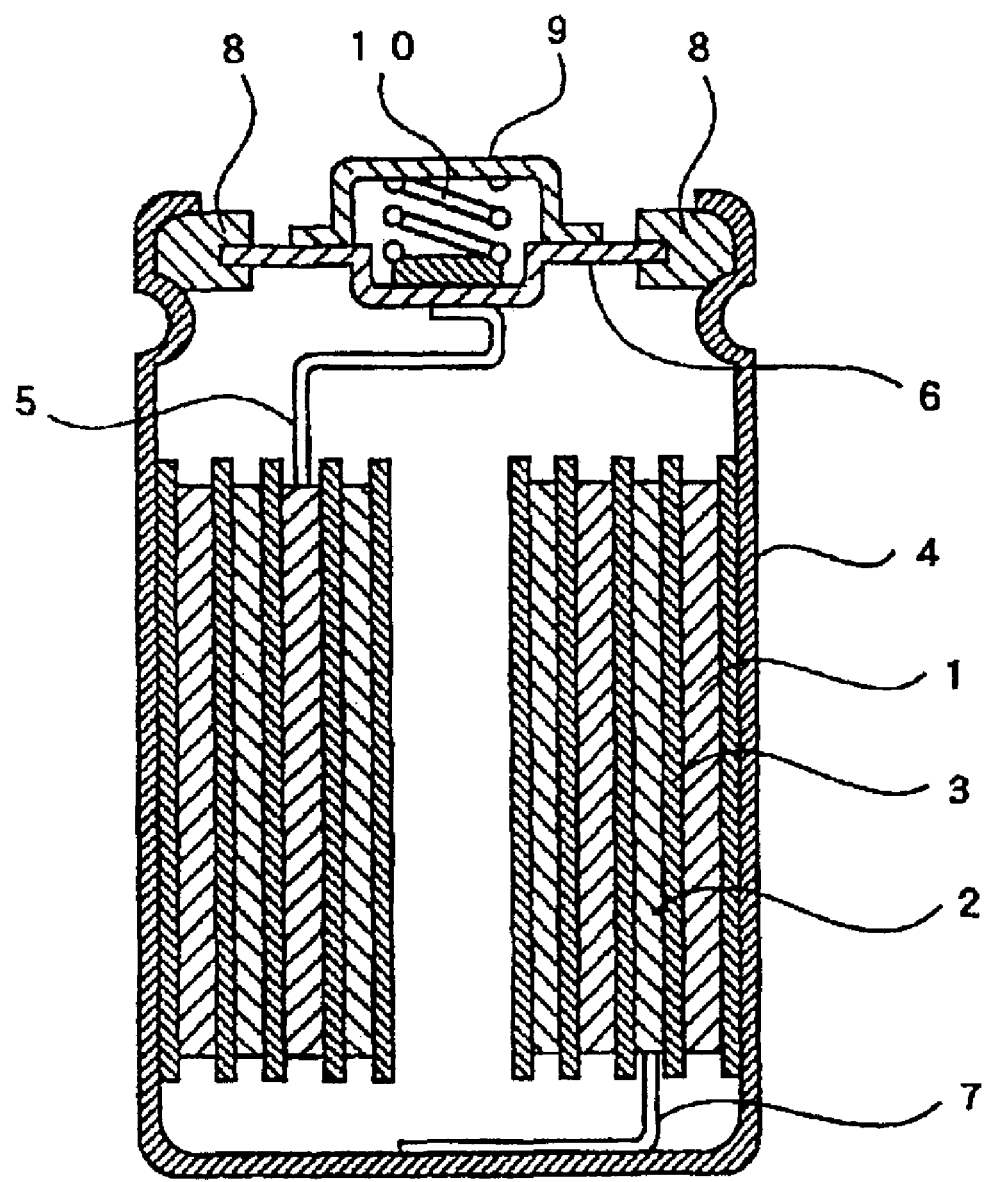
FIG. 1 is a cross section of a nickel-metal hydride storage battery prepared in the Example and Comparative Examples.

Explanation of Elements
  1: positive electrode
  2: negative electrode
  3: separator
  4: negative electrode can
  5: positive electrode lead
  6: sealing lid
  7: negative electrode lead
  8: insulation packing
  9: positive electrode external terminal
  10: coil spring

DETAILED EXPLANATION OF THE INVENTION

When a hydroxide and/or an oxide of at least one element selected from the group consisting of calcium, strontium, scandium, yttrium, lanthanoid and bismuth is added to a positive electrode comprising nickel hydroxide, generation of oxygen at the positive electrode is inhibited to thereby prevent deterioration of the hydrogen absorbing alloy at the negative electrode and to prevent deterioration of discharge characteristics of the negative electrode. Charge-discharge cycle characteristics of the nickel-metal hydride storage battery also are improved.

When a hydroxide and/or an oxide of at least one element selected from the group consisting of calcium, strontium, scandium, yttrium, lanthanoid and bismuth is added to the positive electrode, at least a portion of the surface of the positive electrode is coated with the hydroxide and/or oxide of the element and generation of oxygen at the positive electrode during charge can be more efficiently prevented.

When a hydroxide and/or an oxide of at least one element selected from the group consisting of calcium, strontium, scandium, yttrium, lanthanoid and bismuth is added to the positive electrode containing the nickel hydroxide, if the amount of hydroxide and/or an oxide added to the positive electrode is not sufficient, the expected effects described above cannot be obtained. On the other hand, if the amount of the hydroxide and/or oxide added to the positive electrode is excessive, the ratio of the nickel hydroxide in the positive electrode becomes small and capacity per weight is reduced. Therefore, an amount of the hydroxide and/or oxide added to the positive electrode based on the total amount of the positive electrode active material and the hydroxide and/or oxide is preferably in a range of 0.5 to 5% by weight.

When a hydroxide and/or an oxide of at least one element selected from the group consisting of scandium, yttrium and lanthanoid is added to the negative electrode containing the hydrogen absorbing alloy, such additive prevents metallic nickel included in the hydrogen absorbing alloy from oxidation and a ratio of the metallic nickel on the surface of the hydrogen absorbing alloy is increased. Thus, the surface of the hydrogen absorbing alloy is activated to improve discharge characteristics. Specifically, hydrogen is quickly released from the hydrogen absorbing alloy, and sufficient discharge capacity can be obtained at a low temperature.

If the amount of the hydroxide and/or the oxide of at least one element selected from the group consisting of scandium, yttrium and lanthanoid added to the negative electrode is not sufficient, the expected effects described above, i.e., improvement of discharge characteristics under a low temperature, cannot be obtained. On the other hand, if the amount of the hydroxide and/or the oxide of at least one element selected from the group consisting of scandium, yttrium and lanthanoid added to the negative electrode is excessive, the ratio of the hydrogen absorbing alloy in the negative electrode becomes small and capacity per weight is reduced. Therefore, an amount of the compound added to the negative electrode based on the hydrogen absorbing alloy is preferably in a range of 0.05 to 3% by weight.

DESCRIPTION OF PREFERRED EMBODIMENT

EXAMPLE

An example of a nickel-metal hydride storage battery of the present invention is described below and is compared with comparative examples to show that charge-discharge characteristics of the battery are significantly improved and discharge characteristics at a low temperature are improved such that sufficient discharge capacity when the battery is discharged at a high electric current at the low temperature is obtained. It is of course understood that the present invention can be modified within the scope and spirit of the appended claims.

A positive and negative electrode prepared as described below were used in Example 1.

[Preparation of Positive Electrode]

In the present example, a porous sintered nickel substrate prepared in the following manner was used to produce each positive electrode for the nickel-metal hydride storage battery.

In preparation of the porous sintered nickel substrate, carbonyl nickel powder and a binder were kneaded to prepare a nickel slurry, and the slurry was applied to a punching metal having a thickness of 50 $\mu$m. The slurry on the punching metal was dried, and then sintered in a reducing atmosphere, to obtain the porous sintered nickel substrate. The porous sintered nickel substrate thus obtained had a porosity of 85% and a thickness of 0.65 mm.

Next, the porous sintered nickel substrate was immersed in a mixed solution of nickel nitrate, cobalt nitrate and zinc nitrate so that the mixed solution was impregnated into the porous sintered nickel substrate, after which the sintered nickel substrate was immersed in a 25% sodium hydroxide (NaOH) aqueous solution so that hydroxides of nickel, cobalt and zinc were deposited on the sintered nickel substrate. The above-mentioned operation was repeated six times to provide an active material mainly containing nickel hydroxide to the above-mentioned sintered nickel substrate.

The sintered nickel substrate filled with the positive electrode active material was immersed in a 3% by weight yttrium nitrate solution, and then was immersed in a 25% by weight sodium hydroxide solution (NaOH) that had been heated to 80° C. to obtain a positive electrode in which a coating layer of yttrium hydroxide ($Y(OH)_3$) was formed on the positive electrode active material filled in the sintered nickel substrate. An amount of yttrium hydroxide ($Y(OH)_3$) relative to the total amount of the positive electrode active material and yttrium hydroxide ($Y(OH)_3$) was 3% by weight.

[Preparation of Negative Electrode]

Particles of an hydrogen absorbing alloy having an average particle diameter of 50 $\mu$m and a formula of $MmNi_{3.2}Co_{1.0}Al_{0.2}Mn_{0.6}$ was prepared using Ni, Co, Al, Mn and Misch Metal (Mm), that includes La, Ce, Pr and Nd in a ratio by weight of 25:50:6:19.

A small amount of water was added to a mixture of 100 parts by weight of the hydrogen absorbing alloy particles, 0.5 part by weight of terbium oxide ($Tb_4O_7$) and 1.0 part by weight of poly(ethylene oxide) as a binder to prepare a paste. The paste was coated on both sides of a current collector comprising a nickel plated punching metal. The coated current collector was dried and was rolled to obtain a negative electrode in which terbium oxide ($Tb_4O_7$) was added to a hydrogen absorbing alloy. In the negative electrode, the amount of terbium in terbium oxide ($Tb_4O_7$) relative to the weight of the hydrogen absorbing alloy is 0.43% by weight.

A cylindrical nickel-metal hydride storage battery having a designed capacity of 1000 mAh as shown in FIG. 1 was prepared using the positive and negative electrodes prepared above, an alkaline resistant nonwoven fabric as a separator and 30% by weight of potassium hydroxide as an alkaline electrolyte.

The separator 3 was inserted between the positive electrode 1 and the negative electrode 2 and was rolled spirally, and was placed in a negative electrode can 4 as shown in FIG. 1. The alkaline electrolyte was poured into the negative electrode can 4 and the can was sealed. The positive electrode 1 was connected to a sealing lid 6 through a positive electrode lead 5, and the negative electrode 2 was connected to the negative electrode can 4 through a negative electrode lead 7. The negative electrode can 4 and sealing lid 6 were electrically insulated by an insulation packing 8. A coil spring 10 was placed between the positive sealing lid and a positive electrode external terminal 9. The coil spring 10 is compressed and releases gas from inside of the battery to the atmosphere when pressure in the battery unusually increases.

Comparative Example 1

A nickel-metal hydride storage battery in Comparative Example 1 was prepared in the same manner as Example 1 described above except that terbium oxide ($Tb_4O_7$) was not added to the hydrogen absorbing alloy particles when the negative electrode was prepared.

Comparative Example 2

A nickel-metal hydride storage battery in Comparative Example 2 was prepared in the same manner as Example 1 described above except that a coating layer of yttrium hydroxide ($Y(OH)_3$) was not formed on the positive electrode active material filled in the sintered nickel substrate when the positive electrode was prepared.

Comparative Example 3

A nickel-metal hydride storage battery in Comparative Example 3 was prepared in the same manner as Example 1 described above except that terbium oxide ($Tb_4O_7$) was not added to the hydrogen absorbing alloy particles when the negative electrode was prepared and a coating layer of yttrium hydroxide ($Y(OH)_3$) was not formed on the positive electrode active material filled in the sintered nickel substrate when the positive electrode was prepared.

Then the nickel-metal hydride storage batteries prepared in Example 1 and Comparative Examples 1 to 3 were charged at 100 mA for 16 hours at a temperature of 25° C., and were discharged at 100 mA to 1.0 V at a temperature of 25° C. (this charge and discharge cycle is considered a cycle). Charge and discharge of the batteries were repeated for five cycles to activate the batteries.

The hydrogen absorbing alloy of each negative electrode was removed from the activated nickel-metal hydride storage batteries in Example 1 and Comparative Example 3 for analysis by X-ray photoelectron spectroscopy (XPS).

From the results of the XPS analysis, a thickness of oxide layer on the surface of the hydrogen absorbing alloy in Example 1 was thin, and the valences of nickel (Ni) in the oxide layer were such that an amount of metallic nickel was very high compared to $Ni^{2+}$ or $Ni^{3+}$. A thickness of oxide layer on the surface of the hydrogen absorbing alloy in Comparative Example 3 was thick, and the valences of nickel (Ni) in the oxide layer were such that an amount of $Ni^{2+}$ or $Ni^{3+}$ was much higher than metallic nickel.

The activated nickel-metal hydride storage batteries in Example 1 and Comparative Examples 1 to 3 were tested for high rate discharge characteristics at a low temperature and charge-discharge cycle characteristics. The results are shown in Table 1.

High rate discharge characteristics at a low temperature were evaluated in a way that the activated nickel-metal hydride storage batteries in Example 1 and Comparative Examples 1 to 3 were charged at 1000 mA for 1 hour at a room temperature, and then were cooled to 0° C. The batteries were discharged to battery voltages of 1.0 V at a high electric current of 5000 mA to measure the discharge capacity of each battery. Each battery's discharge capacity is shown as an index when the discharge capacity of the nickel-metal hydride storage battery in Example 1 is 100.

Charge-discharge cycle characteristics were evaluated in a way that the activated nickel-metal hydride storage batteries in Example 1 and Comparative Examples 1 to 3 were charged at 1000 mA for 1 hour, and then were discharged at 1000 mA to 1.0 V (this charge and discharge cycle is considered one cycle). The charge and discharge cycles were repeated to reduce the capacity to 70% of the initial capacity. Obtained number of cycles are shown in Table 1 as an index when the charge-discharge cycle characteristic of the nickel-metal hydride storage battery in Example 1 is 100.

TABLE 1

| | $Tb_4O_7$ in Negative Electrode | $Y(OH)_3$ in Positive Electrode | High rate discharge characteristics at low temperatures | Charge-discharge cycle characteristics |
|---|---|---|---|---|
| Example 1 | Yes | Yes | 100 | 100 |
| Comparative Example 1 | No | Yes | 84 | 90 |
| Comparative Example 2 | Yes | No | 90 | 86 |
| Comparative Example 3 | No | No | 80 | 82 |

As is clear from the results, the nickel-metal hydride storage battery in Comparative Example 1 having a positive electrode that contains a coating layer of yttrium hydroxide ($Y(OH)_3$) on the positive electrode active material filled in the sintered nickel substrate; and the nickel-metal hydride storage battery in Comparative Example 2 having a negative electrode that contains terbium oxide ($Tb_4O_7$) added to the hydrogen absorbing alloy particles had improved high rate discharge characteristics at the low temperature and improved charge-discharge cycle characteristics as compared with the battery in Comparative Example 3.

However, the nickel-metal hydride storage battery in Example 1 having a positive electrode that contains a coating layer of yttrium hydroxide ($Y(OH)_3$) on the positive electrode active material filled in the sintered nickel substrate as well as a negative electrode that contains terbium oxide ($Tb_4O_7$) added to the hydrogen absorbing alloy particles had further improved high rate discharge characteristics at the low temperature and improved charge-discharge cycle characteristics as compared with the battery in Comparative Examples 1 and 2.

The effects of a coating layer of yttrium hydroxide ($Y(OH)_3$) on the positive electrode active material in the nickel-metal hydride storage battery in Example 1 are described above. However, similar effects are obtained when yttrium oxide or a hydroxide or an oxide of at least one element selected from calcium, strontium, scandium, lanthanoid and bismuth is used.

The effects of terbium oxide ($Tb_4O_7$) added to the hydrogen absorbing alloy in the nickel-metal hydride storage battery in Example 1 are described above. However, similar effects are obtained when a hydroxide or an oxide of at least one element selected from lantanoid, scandium and yttrium are used.

ADVANTAGES OF THE INVENTION

As explained above in detail, the generation of oxygen at the positive electrode of the nickel-metal hydride storage battery of the present invention is inhibited by an additive, i.e., a hydroxide and/or an oxide of at least one element selected from the group consisting of calcium, strontium, scandium, yttrium, lanthanoid and bismuth, in the positive electrode. As a result, deterioration of the hydrogen absorbing alloy in the negative electrode by oxidation is prevented and reduction of discharge characteristics of the negative electrode is controlled as well as charge-discharge cycle characteristics of the nickel-metal hydride storage battery are improved.

As described above, a negative electrode of the nickel-metal hydride storage battery of the present invention that comprises a hydrogen absorbing alloy containing nickel includes a hydroxide and/or an oxide of at least one element selected from the group consisting of scandium, yttrium and lanthanoid. As a result, oxidation of nickel included in the hydrogen absorbing alloy is inhibited to increase the ratio of metallic nickel on the surface of the hydrogen absorbing alloy to activate the surface of the hydrogen absorbing alloy and to improve discharge characteristics of the battery. Specifically, even if the battery is discharged at a low temperature, hydrogen is quickly released from the hydrogen absorbing alloy and sufficient discharge characteristics can be obtained at the low temperature.

What is claimed is:

1. A nickel-metal hydride storage battery comprising a positive electrode containing nickel hydroxide, a negative electrode containing a hydrogen absorbing alloy including nickel and an alkaline electrolyte, wherein said positive electrode contains a hydroxide and/or an oxide of at least one element selected from the group consisting of calcium, strontium, scandium, yttrium, lanthanoid and bismuth, and said negative electrode contains terbium hydroxide and/or terbium oxide.

2. The nickel-metal hydride storage battery according to claim 1, wherein at least a portion of a surface of the nickel hydroxide in said positive electrode is coated with the hydroxide and/or the oxide of at least one element selected from the group consisting of calcium, strontium, scandium, yttrium, lanthanoid and bismuth.

3. The nickel-metal hydride storage battery according to claim 2, wherein at least a portion of a surface of the nickel hydroxide in said positive electrode is coated with yttrium hydroxide and/or yttrium oxide.

4. The nickel-metal hydride storage battery according to claim 3, wherein said positive electrode is a sintered nickel electrode.

5. The nickel-metal hydride storage battery according to claim 2, wherein said positive electrode is a sintered nickel electrode.

6. The nickel-metal hydride storage battery according to claim 2, wherein an amount of the hydroxide and/or the oxide of at least one element selected from the group consisting of calcium, strontium, scandium, yttrium, lanthanoid and bismuth contained in the positive electrode based on the total amount of nickel hydroxide and said hydroxide and/or oxide is in a range of 0.5 to 5% by weight.

7. The nickel-metal hydride storage battery according to claim 1, wherein at least a portion of a surface of the nickel hydroxide in said positive electrode is coated with yttrium hydroxide and/or yttrium oxide.

8. The nickel-metal hydride storage battery according to claim 7, wherein said positive electrode is a sintered nickel electrode.

9. The nickel-metal hydride storage battery according to claim 1, wherein said positive electrode is a sintered nickel electrode.

10. The nickel-metal hydride storage battery according to claim 1, wherein an amount of the hydroxide and/or the oxide of at least one element selected from the group consisting of calcium, strontium, scandium, yttrium, lanthanoid and bismuth contained in the positive electrode based on the total amount of nickel hydroxide and said hydroxide and/or oxide is in a range of 0.5 to 5% by weight.

11. The nickel-metal hydride storage battery according to claim 1, wherein an amount of the hydroxide and/or the oxide of at least one element selected from the group consisting of scandium, yttrium and lanthanoid contained in the negative electrode based on the hydrogen absorbing alloy is in a range of 0.05 to 3% by weight.

* * * * *